United States Patent
Yeager et al.

(10) Patent No.: US 9,288,309 B1
(45) Date of Patent: Mar. 15, 2016

(54) QUALITY-BASED PHONE ROUTING

(71) Applicant: Amazon Technologies, Inc., Reno, NV (US)

(72) Inventors: Zachary Lee Yeager, Seattle, WA (US); Ajit Kumar, Seattle, WA (US); Jon Russell Jay, Mercer Island, WA (US); Joseph Daniel Sullivan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 14/036,798

(22) Filed: Sep. 25, 2013

(51) Int. Cl.
*H04M 7/00* (2006.01)
*H04M 3/22* (2006.01)

(52) U.S. Cl.
CPC .................................. *H04M 3/2227* (2013.01)

(58) Field of Classification Search
USPC .............. 379/220.01, 221.01, 221.07, 221.14
See application file for complete search history.

(56) References Cited

U.S. PATENT DOCUMENTS

| | | | |
|---|---|---|---|
| 8,031,696 B2* | 10/2011 | Perry et al. .................... | 370/352 |
| 2003/0228009 A1* | 12/2003 | Shaffer et al. ............ | 379/207.12 |
| 2009/0086947 A1* | 4/2009 | Vendrow .................. | 379/201.12 |
| 2015/0071427 A1* | 3/2015 | Kelley et al. ............. | 379/265.09 |

* cited by examiner

*Primary Examiner* — Quynh Nguyen
(74) *Attorney, Agent, or Firm* — Thomas | Horstemeyer, LLP

(57) ABSTRACT

Disclosed are various embodiments for a call routing application. Routes are evaluated according to aggregated call quality data with respect to a call endpoint. A route is selected according to the evaluation, call costs, or other criteria. A call is then routed via the route to the call endpoint.

23 Claims, 5 Drawing Sheets

QUALITY-BASED PHONE ROUTING

BACKGROUND

Many routes may be used to perform telephone calls. The overall quality of a call may be affected by noise, dropped calls, cross-talk, or other defects. The quality may vary from one route to another. Additionally, the quality of calls on the same route may vary depending on where a call endpoint is located.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Data indicating the quality of a telephone call performed via a respective route can be aggregated over time. Using this aggregated call quality data, a call routing application can determine which route should be used to initiate a call to a call endpoint. This minimizes the potential for poor phone quality due to interference, noise, echoing, cross-talk, or other call defects. Quality may vary depending on the location of a call endpoint. The phone number of a call endpoint can be used to determine the call location, indicating a geographical location of the call recipient. This call location may be used with the aggregated call quality data to determine a call route having a predicted highest call quality for the call location. Additional factors may also be used by the call routing application to select a route, including the cost to perform the call, the time of day, the date, or other data points as can be appreciated. In the following discussion, a general description of the system and its components is provided, followed by a discussion of the operation of the same.

Figure 1:
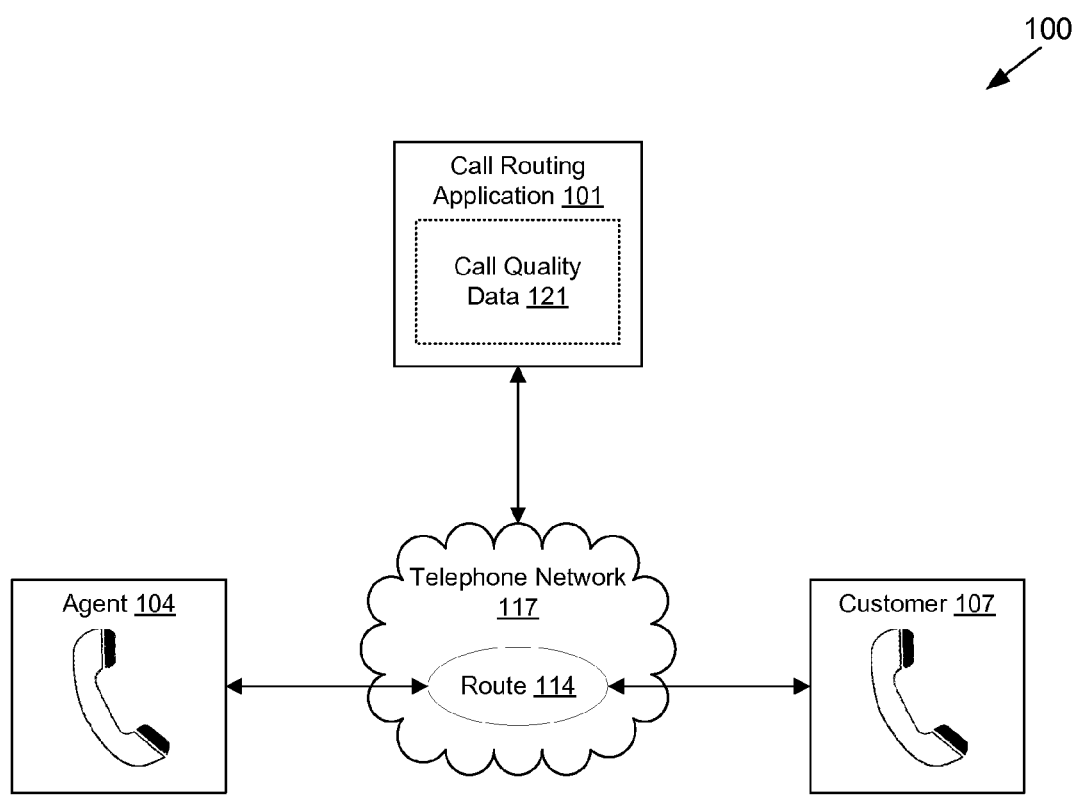
FIG. 1 is a drawing of an example scenario implementing a call routing application according to various embodiments of the present disclosure.

With reference to FIG. 1, shown is a drawing 100 depicting an example scenario implementing a call routing application 101 according to various embodiments. In this example scenario, the call routing application 101 may be implemented to connect an agent 104 to a customer 107 via a route 114 operating in a telephone network 117. The agent 104 may correspond to a customer service representative, technical support representative, telemarketer, or other entity as can be appreciated. The customer 107 may correspond to any active or potential customer of a business associated with the agent 104. The call routing application 101 accesses aggregated call quality data 121 to select a route 114 through which the agent 104 will communicate with the customer 107.

Figure 2:
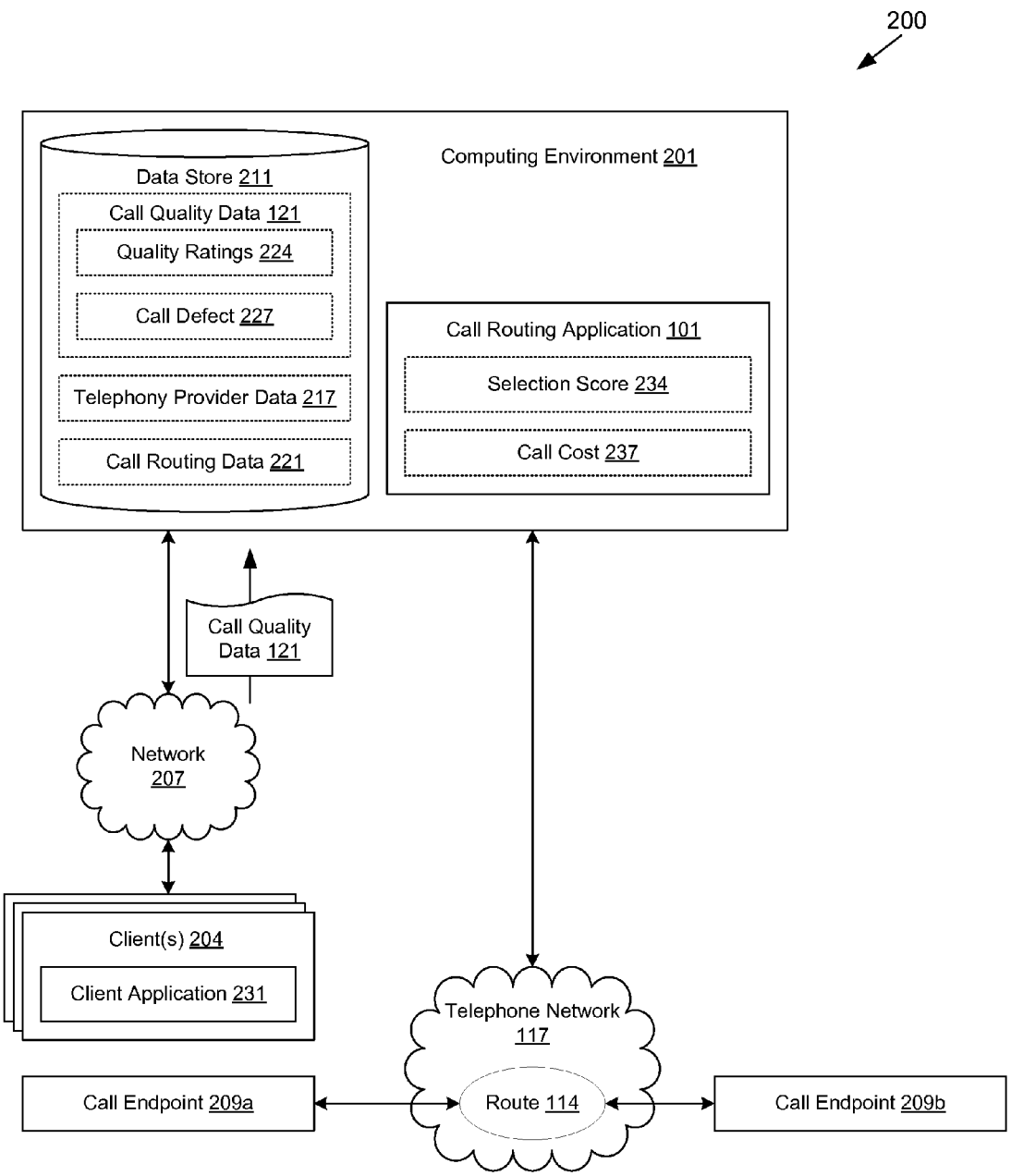
FIG. 2 is a drawing of a networked environment according to various embodiments of the present disclosure.

Turning now to FIG. 2, shown is a networked environment 200 according to various embodiments. The networked environment 200 includes a computing environment 201, and one or more clients 204, which are in data communication with each other via a network 207. The computing environment 201 is in communication with a telephone network 117. Additionally, a call endpoint 209a is connected to another call endpoint 209b via a route 114 of the telephone network 117.

The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The telephone network 117 includes, for example, the Public Switched Telephone Network (PSTN), which may include telephone lines, fiber optic connections, microwave transmission links, cellular connections, or other components which facilitate the transmission and receipt of telephone communications. The telephone network 117 may also include components to facilitate Voice Over Internet Protocol (VoIP) communications or other digital communications as can be appreciated. To this end, the telephone network 117 may share components with the network 207, be a subcomponent of the network 207, or otherwise integrate with the network 207.

A route 114 is a provider of communications services via the telephone network 117. The route 114 may include, for example, wired telephone service providers, cellular telephone service providers, internet service providers, or other service providers. To this end, a route 114 may be associated with dedicated trunks, communications lines, routing paths, or other components of the telephone network 117.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 201, for example, include a call routing application 101, and other applications, services, processes, systems, engines, or functionality not discussed in detail herein. The call routing application 101 is executed to select a route 114 through which a call endpoint 209a may communicate with a call endpoint 209b.

The data stored in the data store 211 includes, for example, call quality data 121, telephony provider data 217, call routing data 221, and potentially other data. The call quality data 121 is aggregated data indicative of call qualities for previously completed calls via the telephone network 117. This may include, for example, quality ratings 224, indicia of call defects 227, or other data. Quality ratings 224 may comprise a qualitative evaluation of call quality entered by a participant in the respective call. The quality ratings 224 may include, for example, numerical ratings, letter grades, or other evaluations. Call defects 227 may include noise, cross-talk, echo, distortion, static, popping, intermittent muting or silence, dropped calls, or other defects in call quality as can be appreciated.

Call quality data 121 may also indicate conditions under which a previous call took place. This may include a start time, end time, duration, or date of a call. The call quality data 121 may further include performance statistics or attributes of a previously completed call including a dropped packet rate, a packet round trip time, a call setup time, a call setup failure rate, or other attributes. Additionally, the call quality data 121 may also include information indicating a route 114 through which the previous call took place. The call quality data 121 may further include data such as phone numbers of call endpoints 209a/b, devices or hardware of call endpoints 209a/b, or other data.

Telephony provider data 217 includes data indicating a telephony provider corresponding to a phone number of a call endpoint 209a/b. For example, this may include a relational database or other data type associating telephony providers with a range of phone numbers, a phone number prefix, predefined phone numbers, or other data points. Call routing data 221 indicates a number of calls routed via a respective route 114. Call routing data 221 may further indicate, for example, timestamps, durations, currently active calls, or other data associated with calls routed via the call routing application 101.

The clients 204 are representative of a plurality of client devices that may be coupled to the network 207. The clients 204 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The clients 204 may each include a display. The display may comprise, for example, one or more devices such as liquid crystal displays (LCD), gas plasma-based flat panel displays, organic light emitting diode (OLED) displays, electrophoretic ink (E ink) displays, LCD projectors, or other types of display devices, etc.

The clients 204 may each be configured to execute various applications such as a client application 231 and/or other applications. The client application 231 may be executed in a client 204, for example, to access network content served up by the computing environment 201 and/or other servers, thereby rendering a user interface on the display. To this end, the client application 231 may comprise, for example, a browser, a dedicated application, etc., and the user interface may comprise a network page, an application screen, etc. The client 204 may be configured to execute applications beyond the client application 231 such as, for example, email applications, social networking applications, word processors, spreadsheets, and/or other applications.

Call endpoints 209a/b are each representative of a participant of a call communicated via the telephone network 117. Call endpoints 209a/b may include devices as described above with respect to clients 204. To this end, although the call endpoint 209a is depicted as being distinct from a client 204, in some implementations, the call endpoint 209a may include the same device as a client 204. The call endpoint 209a and a client 204 may also be separate devices. Additionally, call endpoints 209a/b may include wired telephones, cellular telephones, satellite telephones, or other devices capable of implementing a call via the telephone network.

Next, a general description of the operation of the various components of the networked environment 200 is provided. To begin, the call routing application 101 aggregates call quality data 121 from clients 204. In some embodiments, this comprises obtaining the call quality data 121 as a submission from a client 204. For example, a client 204 may input a call quality rating 224 for a call into a user interface generated by the call routing application 101. A client 204 may also input an indication of call defects 227 for a call participated in by a user of the client 204. The user interface may comprise a network page such as a web page, content encoded for rendering by a dedicated client application 231, or another user interface.

In some embodiments, the call routing application 101 may automatically detect call defects 227 in a call. This may include performing an audio analysis on an in-progress call or a recorded completed call. For example, the call routing application 101 may determine if a rate of change in the amplitude of call audio meets or exceeds a threshold, indicating a "pop" or other noise. As another example, the call routing application 101 may sample call audio at a point at which neither the call endpoint 209a nor call endpoint 209b are providing input to the call, such as a point at which neither participant in a conversation is speaking. If this sampled call audio has an amplitude or a frequency meeting or exceeding a threshold, it may indicate the presence of background noise such as hissing or buzzing due to the communications channel. As an additional example, digital signal processing approaches may be applied to call audio to detect echo, cross-talk, interference, or other call defects 227. Other approaches may also be used to perform an audio analysis to detect call defects 227.

The detected call defects 227 will then be recorded as call quality data 121. The call routing application 101 may also detect a call defect 227 for a dropped call responsive to detecting a call back from a call endpoint 209b after a terminated call. For example, a call between call endpoints 209a/b is terminated. A call endpoint 209b then attempts to call the call endpoint 209a within a time window after the call termination. This may indicate that the terminated call was dropped, and the call endpoint 209b is attempting to resume communication with the call endpoint 209a. In further embodiments, the call routing application 101 may automatically calculate a call quality rating 224 as a function of detected call defects 227 or other data.

As the call quality data 121 is aggregated, the call quality data 121 is stored with respect to a route 114 through which the respective call was performed. This may include, for example, storing a relational database entry indicating the call quality data 121 and the route 114. Additional metadata may also be stored with respect to call quality data 121, including a start time, an end time, a date, call endpoint 209a/b phone numbers, or other data. Call quality data 121 may also be aggregated by another approach.

Next, the call routing application 101 receives an indication that a call endpoint 209a is to be connected to a call endpoint 209b via the telephone network 117. For example, a client 204 may correspond to an agent, customer service representative, or other entity. The user of the client 204 may be associated with a call endpoint 209a, and is attempting to call a current or potential customer associated with the call endpoint 209b. The client 204 may communicate the indication to begin a call to the call routing application 101 via the network 207.

For example, the computing environment 201 may encode an interface for rendering by a client application 231 which accepts as input data to facilitate a call to a call endpoint 209b, such as a phone number, customer identifier, customer profile information, or other data. In other embodiments, the call endpoint 209a may call a central routing phone number associated with the computing environment 201 and request a connection to the call endpoint 209b. Other approaches may also be used to receive the indication that a call endpoint 209a is to be connected to a call endpoint 209b.

The call routing application 101 then selects a route 114 through which a call between the call endpoints 209a/b will be routed. Selecting a route 114 may comprise selecting a trunk associated with the route 114. The trunk may include a physical trunk or a virtual trunk. Selecting a route 114 may also include selecting a trunk group having one or more trunks. The call would then be routed by a trunk within the trunk group. In embodiments in which the call is routed via VoIP components, selecting a route 114 may include selecting a packet route or other attribute of the call.

In order to select a route 114, the call routing application 101 may calculate a selection score 234 with respect to a route 114. The selection score 234 is a numerical indication of a predicted quality level for a call facilitated by the respective route 114. In some embodiments, a selection score 234 for a route 114 may be calculated as a function of quality ratings 224 indicated in call quality data 121 corresponding to the respective route 114. This may comprise, for example, calculating an average, minimum, maximum, or other aggregate quality rating 224 value.

In other embodiments, a selection score 234 for a route 114 may be calculated as a function of call defects 227 indicated in call quality data 121 corresponding to the respective route 114. For example, a selection score 234 may be calculated by decrementing a base value according to the call defects 227. The base value may comprise a value calculated as a function of quality ratings 224, a default value, or another value. The base value may be decremented according to a total number of call defects 227 indicated in call quality data 121, an average, minimum, maximum, median, or other quantity of call defects 227 indicated in call quality data 121, or by another approach.

In some embodiments, the selection score 234 may be calculated by weighing respective call defects 227. For example, a base value may be decremented by a lower amount for call defects 227 which may be more tolerable than other call defects 227. In this example, a base value may be decremented by a lower amount for noise or static, and by a larger amount for dropped calls or cross-talk. Other approaches may also be used to calculate the selection score 234 as a function of the call defects 227.

The selection score 234 for a route 114 may also be calculated according to a context of a call to be routed by the call routing application 101 and previously completed calls corresponding to the call quality data 121 corresponding to the respective route 114. For example, call quality data 121 may be weighted according to a degree of similarity between the context of the previously completed call corresponding to the call quality data 121 and the call to be routed. The degree of similarity may be calculated according to a time of day, a day of week, or other data.

The selection score 234 for a route may be calculated according to a location of a call endpoint 209b. The location may correspond to a geographic region, state, city, area code, or other geographic subdivision. The location may be determined, for example, from a predefined number of leading digits of a phone number of the call endpoint 209b. For example, for an American phone number, the location may correspond to an area code plus a three-digit prefix of a phone number. The location may also be determined from customer data corresponding to the call endpoint 209b, from referencing an address or location lookup table according to the phone number of the call endpoint 209b.

In some embodiments, the location of a call endpoint 209b may be obtained from a customer profile, user profile, social networking profile, or other profile data associated with the call endpoint 209b. For example, if the call endpoint 209b corresponds to a customer of an electronic commerce system or other commerce service, the location of the call endpoint 209b may be obtained from a customer profile, delivery address or mailing address, or other data.

In some embodiments, the call routing application 101 can determine the location of a call endpoint 209b from data obtained from a client device or other device corresponding to the call endpoint 209b. For example, a call location may be determined from a network address corresponding to the call endpoint 209b. As another example, a call location may be determined from Global Positioning System (GPS) data or other data identifying a geographical location of a call endpoint 209b. A location of a call endpoint 209b may also be determined by another approach.

In embodiments in which the selection score 234 is calculated according to a location of a call endpoint 209b, the call routing application 101 may weigh call quality data 121 used to calculate a selection score 234 according to the location. For example, a selection score 234 may be weighed as a function of a distance between the location of the call endpoint 209b for the call to be routed and a location of a previous call endpoint 209b of a previous call corresponding to the call quality data 121. In other embodiments, the call routing application 101 may select or filter the call quality data 121 to be used in calculating a selection score 234. For example, the call routing application 101 may select call quality data 121 corresponding to the same location as the call endpoint 209b, a location within a distance threshold, or other call quality data 121. The call routing application 121 would then calculate the selection scores 234 from the selected call quality data 121. Other approaches may also be used to calculate selection scores 234 according to a location of a call endpoint 209b.

The selection score 234 for a route may be calculated according to a telephony provider of a call endpoint 209b. The telephony provider may correspond to a wired telephony provider, a wireless or cellular telephony provider, an internet service provider (ISP), or other service provider. The telephony provider may be determined, for example, by referencing telephony provider data 217 indicating a telephony provider corresponding to the phone number of the call endpoint 209b. In other embodiments, the call routing application 101 may determine the telephony provider by accessing a data store, Application Program Interface (API), web service, or other functionality exposed via the network 207. Other approaches may also be used to determine a telephony provider of a call endpoint 209b.

In embodiments in which the selection score 234 is calculated according to a telephony provider of a call endpoint 209b, the call routing application 101 may weigh call quality data 121 used to calculate a selection score 234 according to the telephony provider. For example, call quality data 121 corresponding to the telephony provider may be weighted higher for the purposes of calculating a selection score.

In other embodiments, the call routing application 101 may select or filter the call quality data 121 to be used in calculating a selection score 234. For example, the call routing application 101 may select call quality data 121 corresponding to the same telephony provider as the call endpoint 209b. The call routing application 101 would then calculate the selection scores 234 from the selected call quality data 121. Other approaches may also be used to calculate selection scores 234 according to a telephony provider of a call endpoint 209b.

Additionally, in some embodiments, the selection score 234 may be calculated as a function of a call cost 237 of the respective route 114. The call cost 237 is a financial cost associated with placing a call via the route 114. The call cost 237 may include a per-call cost, a duration-based cost such as a per-minute cost, a cost calculated as a function of an amount of bandwidth used, or another cost. Other approaches may also be used to calculate the selection score 234 for a route 114.

Next, the call routing application 101 then selects a route 114 through which a call between call endpoints 209a/b is routed. In some embodiments, selecting the route 114 comprises selecting a route 114 having a highest selection score 234. In other embodiments, selecting the route 114 comprises selecting a route 114 having a lowest call cost 237 from a subset of the routes 114 having selection scores 234 meeting or exceeding a threshold. In further embodiments, the call routing application 101 may apply a machine learning approach or a rule-based approach to select the route 114 according to selection scores 234, quality ratings 224, call defects 227, a context of the call to be routed, or other data.

Additionally, in some embodiments, the call routing application 101 may select a route 114 according to call routing data 221. For example, call routing data 221 may indicate a number of calls routed via a particular route 114. Call routing data 221 may also indicate a threshold for a maximum number of calls to be routed via the route 114 within a time period, or another threshold. In such an embodiment, the call routing application 101 may eliminate routes 114 from selection that have a number of routed calls meeting the threshold.

Selecting the route 114 may include designating a trunk corresponding to the route 114 through which the call will be routed. The trunk may include a physical trunk or a virtual trunk. Selecting a route 114 may also include selecting a trunk group that includes multiple trunks. Additionally, selecting the route 114 may include selecting a data routing path, a voice routing path, or another communications path that is at least a portion corresponding to the route 114. Other approaches may also be used to select a route 114.

After the route 114 has been selected, the call routing application 101 initiates the call between call endpoints 209a/b. In some embodiments, this includes routing or forwarding a call between the call endpoint 209a and a telephone network 117 component associated with the call routing application 101 to the call endpoint 209b. For example, a call endpoint 209a may call to a switchboard or operator associated with the call routing application 101. The switchboard or operator may then route the call from the call endpoint 209a to the call endpoint 209b via the selected route. In other embodiments, this may include the call routing application 101 initiating a multi-party call to each of the call endpoints 209a/b via the selected route 114. The call routing application 101 may then exit the multi-party call, resulting in a two-way call between call endpoints 209a/b.

In embodiments in which the call endpoint 209a is a client 204, initiating the call between call endpoints 209a/b may include initiating a VoIP session between the client 204 and the call endpoint 209b. Other approaches may also be used to initiate the call between call endpoints 209a/b.

Figure 3:
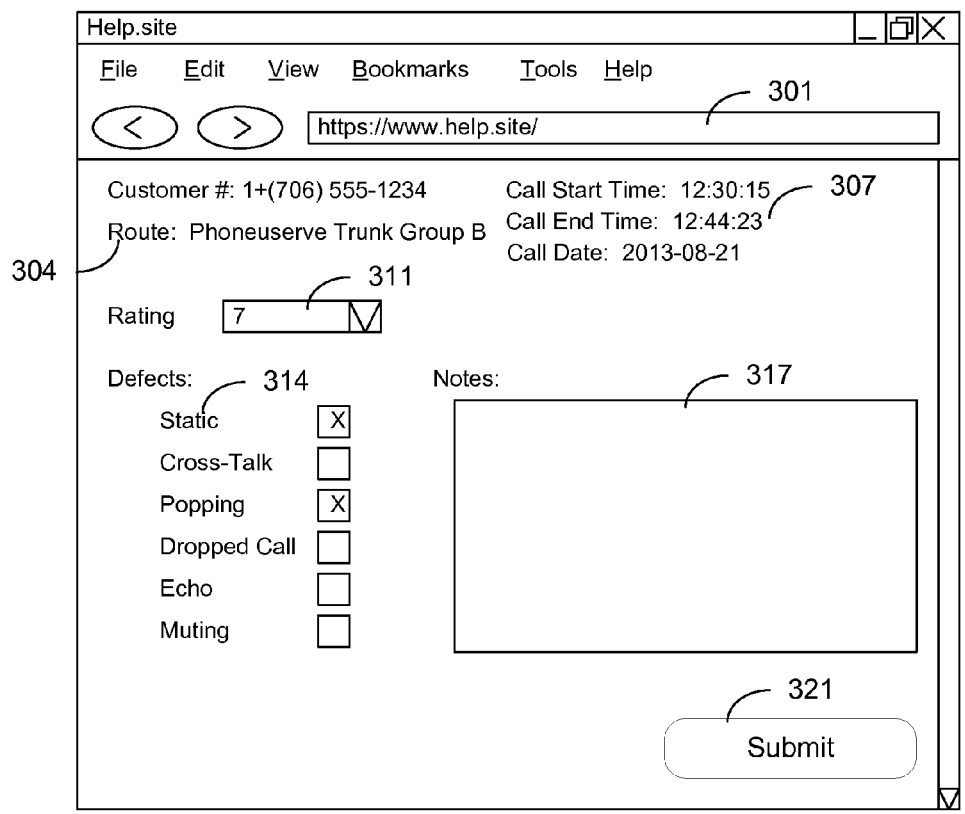
FIG. 3 is a pictorial diagram of an example user interface rendered by a client in the networked environment of FIG. 2 according to various embodiments of the present disclosure.

Referring next to FIG. 3, shown is an example user interface 300 encoded for rendering by a client 204 (FIG. 2) for communicating call quality data 121 (FIG. 1) for a completed call between a call endpoint 209a (FIG. 2) and a call endpoint 209b (FIG. 2) to the call routing application 101 (FIG. 1). In some embodiments, the user interface 300 comprises a network page such as a web page encoded for rendering by a browser client application 231 (FIG. 2). In other embodiments, the user interface 300 comprises content encoded for rendering by a dedicated client application 231.

Item 301 is a Uniform Resource Locator (URL) directed to content served by the computing environment 201 (FIG. 2). Item 304 is an indication of a phone number and a telephony provider corresponding to a call endpoint 209b. Item 307 is an indication of a call start time, call end time, and a call date for the previously completed call between call endpoints 209a/b. Item 311 is a drop down menu to select a call rating 224 (FIG. 2) for the previously completed call. Item 314 is a selection menu to select call defects 227 (FIG. 2) experienced during the previously completed call. Item 317 is an input field for additional notes or comments related to the previously completed call. Item 321 is a button which, when clicked, encodes the call quality data 121 for communication to the call routing application 101 via the network 207 (FIG. 2).

Figure 4:
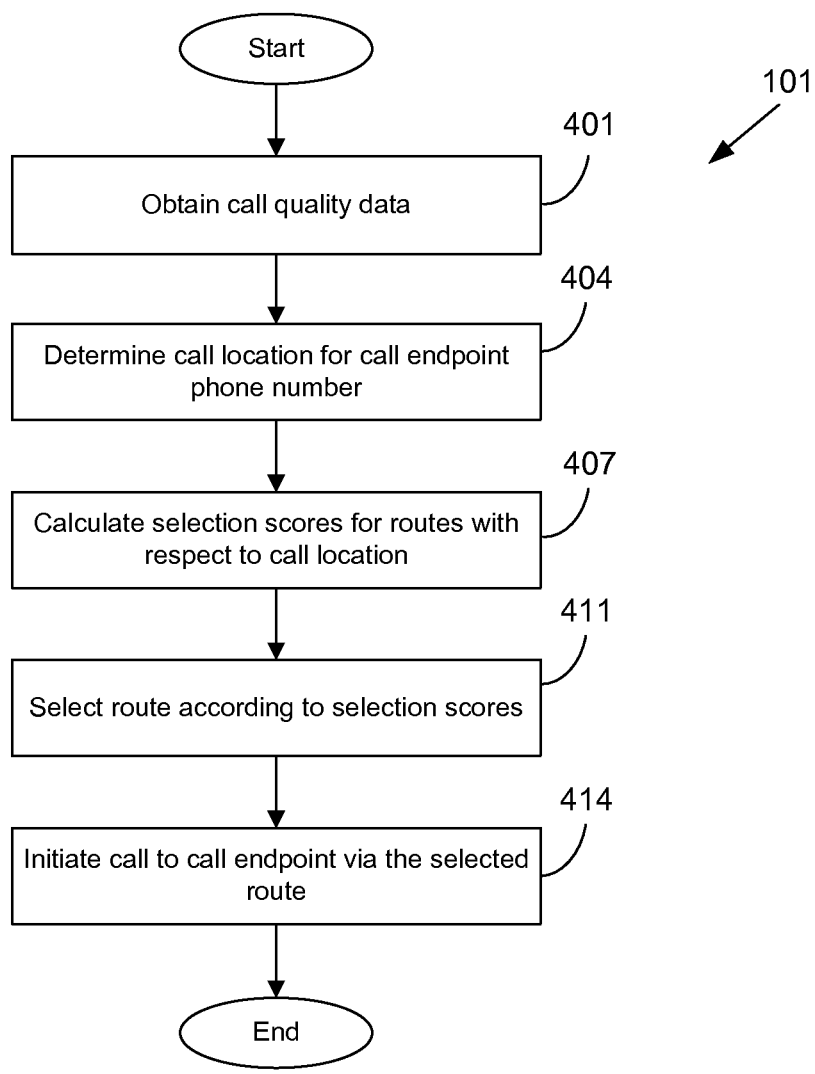
FIG. 4 is a flowchart illustrating one example of functionality implemented as portions of a call routing application executed in a computing environment in the networked environment of FIG. 2 according to various embodiments of the present disclosure.

Moving on to FIG. 4, shown is a flowchart that provides one example of the operation of a portion of the call routing application 101 according to various embodiments. It is understood that the flowchart of FIG. 4 provides merely an example of the many different types of functional arrangements that may be employed to implement the operation of the portion of the call routing application 101 as described herein. As an alternative, the flowchart of FIG. 4 may be viewed as depicting an example of elements of a method implemented in the computing environment 201 (FIG. 2) according to one or more embodiments.

Beginning with box 401, the call routing application 101 aggregates call quality data 121 (FIG. 1). This may comprise obtaining call quality data 121 corresponding to previously completed calls that is communicated by the clients 204 (FIG. 2) via the network 207 (FIG. 2) for addition to aggregated call quality data 121 stored in the data store 211 (FIG. 2). In other embodiments, this may comprise dynamically generating call quality data 121 from recorded or in-progress calls between a call endpoint 209a (FIG. 1) and a call endpoint 209b (FIG. 1). For example, the call routing application 101 may dynamically generate call quality data 121 by performing an audio analysis on a recorded or in-progress call to detect call defects 227 (FIG. 2). The call routing application 101 may also calculate a call quality rating 224 (FIG. 2) as a function of detected call defects 227 or other data. Other approaches may also be used to aggregate call quality data 121.

Next, in box 404, the call routing application 101 determines a location for a call endpoint 209b corresponding to a call to be routed according to a phone number of the call endpoint 209b. For example, the call routing application 101 may select a predefined number of leading digits of the phone number. The call routing application 101 may then reference a relational database, lookup table, or other data structure to determine a location corresponding to the leading digits. The leading digits may include, for example, an area code and prefix, or another selection of digits.

After determining the location of the call endpoint 209b, in box 407, the call routing application 101 calculates selection scores 234 (FIG. 2) for routes 114 (FIG. 1) with respect to the location of the call endpoint 209b. For example, the call routing application 101 may weigh call quality data 121 (FIG. 1) used to calculate a selection score 234 according to the location. For example, a selection score 234 may be weighed as a function of a distance between the location of the call endpoint 209b for the call to be routed and a location of a previous call endpoint 209b of a previous call corresponding to the call quality data 121. In other embodiments, the call routing application 101 may select or filter the call quality data 121 to be used in calculating a selection score 234. For example, the call routing application 101 may select call quality data 121 corresponding to the same location as the call endpoint 209b, a location within a distance threshold, or other call quality data 121. The call routing application 101 would then calculate the selection scores 234 from the selected call quality data 121.

Calculating a selection score 234 for a route 114 may be calculated as a function of quality ratings 224 (FIG. 2) indicated in call quality data 121 corresponding to the respective route 114. This may comprise, for example, calculating an average, minimum, maximum, or other aggregate quality rating 224 value. In other embodiments, a selection score 234 for a route 114 may be calculated as a function of call defects 227 indicated in call quality data 121 corresponding to the respective route 114. For example, a selection score 234 may be calculated by penalizing an overall selection score 234 according the call defects 227. The overall selection score 234 may be penalized by decrementing the selection score 234 by a predefined value for each call defect 227. The amount by which the selection score 234 is decremented may be identical for all call defects 227, or vary according to the type of call defect 227.

Calculating the selection score 234 may be performed by calculating an intermediary selection score 234 with respect to each of the selected call quality data 121 entries. The intermediary selection scores 234 may then be summed, averaged, added, or have another function applied to generate a final selection score 234 for a respective route 114. Additionally, the intermediary selection scores 234 may be weighted according to a degree of similarity between a context of the corresponding call quality data 121 entry and the call to be routed. The context may include, for example, a time of day, day of week, date, a telephony provider of the call endpoint 209b, a location of the call endpoint 209b, or other data.

In box 411, the call routing application 101 selects a route 114 according to the calculated selection scores 234. This may include selecting a route 114 having a highest selection score 234. This may also include selecting a route 114 having a lowest call cost 237 (FIG. 2) from a subset of routes 114 having a selection score 234 meeting a threshold. Additionally, the call routing application 101 may select the route 114 from a subset of the routes 114 having a number of calls previously routed within a time window falling below a threshold. The number of calls, the time window, or the threshold may be determined as a function of call routing data 221 (FIG. 1), or other data. Selecting the route 114 may include designating a physical trunk, virtual trunk, data routing path, or other component of a communications path corresponding to the route 114. The route 114 may also be selected by another approach.

After selecting the route 114, in box 414, the call routing application 101 initiates the call between call endpoints 209a/b. In some embodiments, this includes routing or forwarding a call between the call endpoint 209a and a telephone network 117 (FIG. 1) component associated with the call routing application 101 to the call endpoint 209b. For example, a call endpoint 209a may call to a switchboard or operator associated with the call routing application 101. The switchboard or operator may then route the call from the call endpoint 209a to the call endpoint 209b via the selected route. In other embodiments, this may include the call routing application 101 initiating a multi-party call to each of the call endpoints 209a/b via the selected route 114. The call routing application 101 may then exit the multi-party call, resulting in a two-way call between call endpoints 209a/b.

In embodiments in which the call endpoint 209a is a client 204, initiating the call between call endpoints 209a/b may include initiating a VoIP session between the client 204 and the call endpoint 209b. Other approaches may also be used to initiate the call between call endpoints 209a/b.

Figure 5:
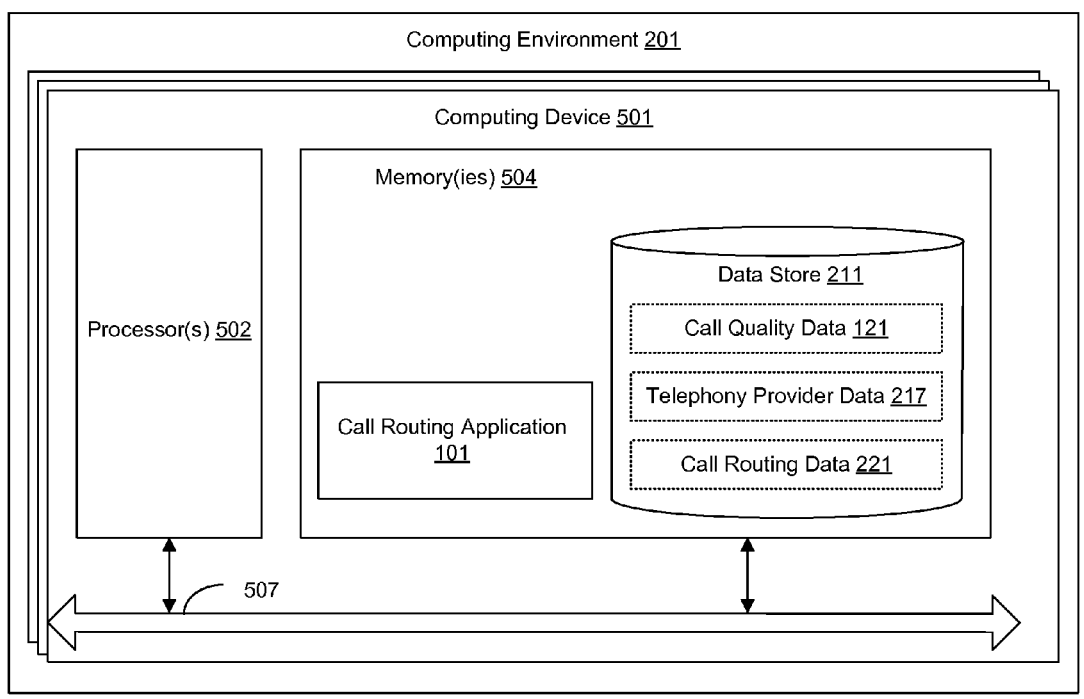
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 201 according to an embodiment of the present disclosure. The computing environment 201 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are a call routing application 101, and potentially other applications. Also stored in the memory 504 may be a data store 211 storing call quality data 121, telephony provider data 217, call routing data 221, and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the call routing application 101, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the call routing application 101. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a call routing application 101, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the call routing application 101, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   add at least one detected dropped call and a plurality of call quality ratings for a plurality of previously completed calls to aggregated call quality data;
   determine a call location as a function of a predefined quantity of leading digits of a call endpoint phone number;
   calculate a plurality of selection scores for a plurality of call routes as a function of the aggregated call quality data;
   select, from the plurality of call routes, one of the plurality of call routes from a subset of the plurality of call routes having a corresponding one of the plurality of call quality ratings meeting a threshold and having a lowest call cost with respect to the subset;
   select a trunk corresponding to the one of the plurality of call routes;
   initiate a call via the trunk to the call endpoint phone number; and
   wherein the aggregated call quality data comprises a call quality rating for at least one previously completed call.

2. The non-transitory computer-readable medium of claim 1, wherein the program, when executed, further causes the at least one computing device to at least:
   detect at least one call defect; and
   store an indication of the at least one call defect in the aggregated call quality data.

3. A system, comprising:
   at least one computing device configured to at least:
      determine a call location;
      calculate a plurality of selection scores for a plurality of call routes as a function of aggregated call quality data;
      select, from the plurality of call routes, one of the plurality of call routes as a function of the plurality of selection scores;
      initiate a call via the one of the plurality of call routes to the call location; and
      wherein the aggregated call quality data comprises a call quality rating for at least one previously completed call.

4. The system of claim 3, wherein selecting the one of the plurality of call routes further comprises selecting the one of the plurality of call routes as having a corresponding one of the plurality of selection scores meeting a threshold.

5. The system of claim 4, wherein the one of the plurality of call routes is one of a subset of the plurality of call routes meeting the threshold, and wherein selecting the one of the plurality of call routes further comprises selecting the one of the plurality of call routes as having a lowest cost with respect to a remainder of the subset of the plurality of call routes.

6. The system of claim 3, wherein the aggregated call quality data comprises at least one call defect of the at least one previously completed call, and calculating the plurality of selection scores further comprises calculating the selection scores as a function of at least one weight corresponding to the at least one call defect.

7. The system of claim 3, wherein the at least one weight is a first at least one weight, and the selection scores are further calculated as a function of a second at least one weight applied to a cost of a respective one of the plurality of call routes.

8. The system of claim 3, wherein the at least one computing device is further configured to at least:
   detect at least one call defect; and
   store an indication of the at least one call defect in the aggregated call quality data.

9. The system of claim 8, wherein the at least one call defect comprises a call static, a call popping, an instance of crosstalk, an instance of echo, a call distortion, an instance of interference, a period of silence, or a dropped call.

10. The system of claim 3, wherein the call location is determined as a function of a predefined quantity of leading digits of a phone number corresponding to the call location.

11. The system of claim 3, wherein the call location is determined as a function of a network address or a Global Positioning System location corresponding to the call location.

12. The system of claim 3, wherein determining the call location further comprises obtaining the call location from a customer profile.

13. The system of claim 3, wherein the at least one computing device is further configured to at least:
   determine a telephony provider corresponding to the call location; and
   wherein the plurality of selection scores are calculated as a function of the telephony provider.

14. The system of claim 13, wherein determining the telephony provider corresponding to the call location further comprises obtaining an indication of the telephony provider from a relational database entry associated with a phone number corresponding to the call location.

15. A method, comprising:
   calculating, in a computing device, a plurality of selection scores for a plurality of call routes as a function of aggregated call quality data and an endpoint phone number;
   selecting, in the computing device, from the plurality of call routes, one of the plurality of call routes as a function of the plurality of selection scores;
   initiating, in the computing device, a call via the one of the plurality of call routes to the endpoint phone number; and
   wherein the aggregated call quality data comprises a call quality rating for a previously completed call.

16. The method of claim 15, wherein the one of the plurality of call routes is further selected as a function of a cost of the one of the plurality of call routes.

17. The method of claim 15:
   wherein selecting the one of the plurality of call routes further comprises selecting a trunk group corresponding to the one of the plurality of call routes; and
   wherein the call is routed via the trunk group.

18. The method of claim 17, wherein the trunk group includes at least one of a physical trunk or a virtual trunk.

19. The method of claim 15, wherein the selection scores are further calculated as a function of a time of day of the call or a date of the call.

20. The method of claim 15, wherein the one of the plurality of call routes is selected as a function of a call distribution associated with the call routes.

21. The method of claim 15, wherein selecting the one of the plurality of call routes further comprises selecting at least a portion of a Voice Over Internet Protocol (VoIP) route.

22. The method of claim 15, wherein the aggregated call quality data comprises at least one of a dropped packet rate, an indication of a call defect, a call quality rating, a call failure rate, a round trip time or a call setup time.

23. The method of claim 15, further comprising:
   detecting, by the at least on computing device, at least one call defect; and
   storing, by the at least one computing device, an indication of the at least one call defect in the aggregated call quality data.

* * * * *